Dec. 29, 1964     A. R. CORBIN     3,163,191
SPECTROGRAPHIC ELECTRODE SHAPER
Filed July 30, 1962
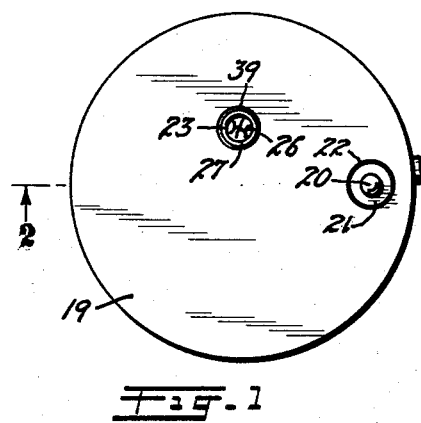
Fig. 1
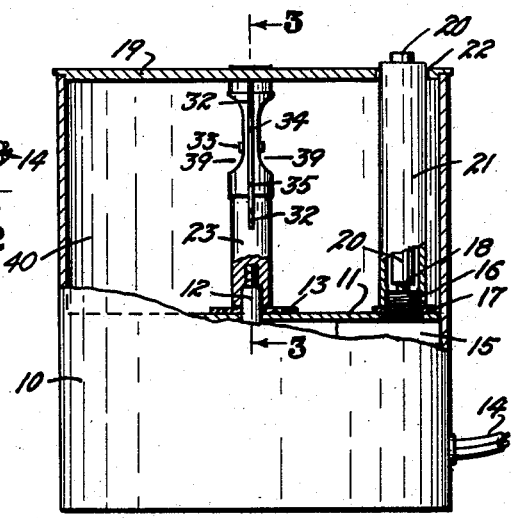
Fig. 2
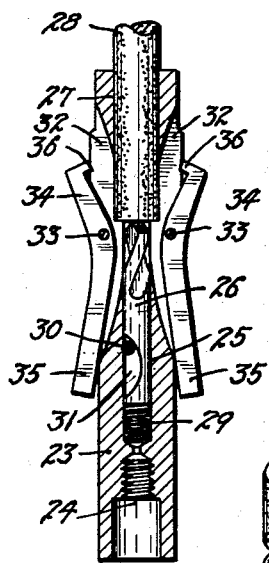
Fig. 3
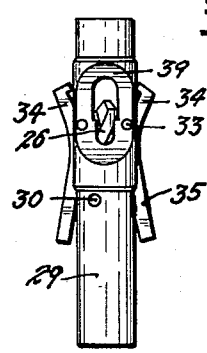
Fig. 5
Fig. 6
Fig. 4
INVENTOR.
ASHLEY R. CORBIN
BY
ATTORNEY

United States Patent Office 3,163,191
Patented Dec. 29, 1964

3,163,191
SPECTROGRAPHIC ELECTRODE SHAPER
Ashley R. Corbin, 5390 W. 1st Ave., Denver, Colo.
Filed July 30, 1962, Ser. No. 213,452
3 Claims. (Cl. 144—46)

This invention relates to spectographic electrodes of the type used in spectroscopic analysis and more particularly to means for forming and shaping the electrodes for receiving the specific samples to be analyzed.

The basic raw material for forming spectroscopic electrodes are round rods of carbon or graphite varying in diameter from 1/8" to 1/2" and usually supplied in 12" lengths. These rods must be cut to lengths suitable for use in the spectrograph (usually 1 1/2" length) and one extremity of each resulting piece must be machined to form a cup or cavity to receive the sample to be analyzed and undercut to form a neck of reduced diameter below the cup to establish the end point of burning.

This machining is a difficult, time-consuming procedure since it must be done with extreme accuracy to provide uniform and consistent analytical results and unvarying rates of vaporization. As a result, laboratory forming of the electrodes has been substantially replaced by expensive, pre-formed, custom-made electrodes. While pre-formed electrodes are highly satisfactory in use, they result in great inconvenience and expense since an exceedingly large inventory of shapes and sizes must be constantly kept on hand to meet the variety of problems presented to the spectographer.

The principal object of this invention is to provide a simple, rapid and highly efficient, electrode shaper for desk or bench use which will instantly and simultaneously form the specimen cup and undercut in a graphite rod by simple insertion of the rod in the shaper mechanism.

Another object is to provide a portable unitary electrode shaper in which the forming mechanism can be quickly interchanged to form cavities of various sizes and shapes with or without undercuts and to also form undercuts of various sizes, shapes and depths.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a top plan view of the electrode shaper;
FIG. 2 is a side elevational view thereof partially broken away on the line 2—2, FIG. 1, to show interior structure;
FIG. 3 is a vertical detail longitudinal section taken on the line 3—3, FIG. 2, through a shaping tool employed in the shaper as it would appear when stationary with a graphite rod pressed therein;
FIG. 4 is a similar section to FIG. 3 showing the shaping tool elements in the rotating, electrode-finishing position;
FIG. 5 is a full size side elevational view of the shaping tool; and
FIG. 6 is an enlarged perspective view of an electrode as formed by the shaper of this invention.

The invention comprises a vertical cylindrical housing 10 having a circular sub-bottom plate 11 sealed therein intermediate its height. The housing is closed at the top by means of a removable top plate 19 fitted therein and thereover. An electric motor (not shown) is mounted in the housing below the sub-bottom plate in any suitable manner. The upper extremity of the shaft of the motor, indicated at 12, extends vertically through the bottom plate surrounded by a resilient sealing washer 13. The current for operating the motor is conducted through an extension cord 14 and is controlled by any conventional normally open, micro-type switch, 15, having a threaded nipple 16 extending upwardly through the sub-bottom plate 11 and secured therein by means of a nipple nut 17. The nipple contains a switch-closing press button 18. The motor, the switch and the electrical circuit are conventional and need not be detailed here. Suffice it to say that pressure on the press button 18 causes the motor shaft 12 to rotate. Pressure is manually applied to the bottom 18 by means of a vertical plunger 20 supported in a plunger guide sleeve 21 which is threaded at its lower extremity on the nipple 16 and extends upwardly through an opening 22 in the top plate 19 to position the upper extremity of the plunger in a convenient position for the operator.

The actual shaping of the electrode is accomplished by means of a shaping tool threaded onto the upwardly projecting extremity of the motor shaft 12. The tool comprises a vertically elongated cylindrical shank 23 having an internally threaded, axial socket 24 in its lower extremity for threading onto the motor shaft 12 and arranged to extend upwardly through an opening 39 in the top plate 19.

The shank is provided with an axial bore 25, in which a drill bit 26 is slidably mounted, and with a counterbore 27 in its upper extremity for receiving the electrode rod, indicated at 28, to be shaped. The drill bit is constantly and resiliently urged upwardly in the counterbore 27 by a compression spring 29 seated in the bottom of the bore 25. The amount of vertical movement of the drill bit is limited by a stop pin 30 inserted tangentially through the shank, and through an arcuate limiting notch 31, milled in the side of the bit 26.

Two relatively narrow, arcuate, longitudinally-extending lever slots 32 are milled in the shank 23 in oppositely opposed relation, there being one slot at each side of the juncture between the axial bore 25 and the counterbore 27. A relatively thin tilting lever member is mounted in each slot 32 upon a horizontally and tangentially extending pivot pin 33. Each lever member comprises a relatively short upper cutting portion 34 and a relatively long lower centrifugal portion 35 positioned at an obtuse angle to each other with the pivot pin being positioned at the juncture of the two portions. The upper cutting portion of each lever member carries an integrally formed, inwardly projecting cutter blade 36 at its extremity, the size and shape of which corresponds to the cross section of the undercut desired in the electrode to be shaped.

In use, the electrode rod 28 is pressed downwardly in the counterbore 27 to the bottom of the latter and in moving downwardly the rod depresses the drill bit against the bias of the compression spring, as shown in FIG. 3. The operator holds the electrode stationary and contacts the plunger 20 to start the motor to initiate rotation of the shaping tool.

Rotation of the shaping tool causes the drill bit to bore, under pressure of the spring 29, a socket 37 in the end of the electrode, the depth of which is accurately pre-set by the length of movement of the limiting notch 31 and the stop pin 30. The boring of the socket places a temporary load on the motor which maintains the speed relatively low for a fraction of a second until the bore is completed. Upon completion of the bore, the load is released and the motor instantly resumes full speed to cause the centrifugal portions 35 of the tilting lever members to swing outwardly so as to swing the rapidly rotating cutter blades 36 inwardly against the electrode rod, as shown in FIG. 4, to form a circumferential undercut 38 therein. The inward movement of the cutter blades ceases when the upper portions of the lever members contact and rest against the external surface of the rod 28. The final result is an electrode, as shown in FIG. 6.

The shaper is quickly adaptable for forming electrodes of various designs by interchange of the shaping tools on the motor shaft 12. Should no undercut be desired, the shaping tool would be replaced by a tool in which the tilting lever members are eliminated. Should undercuts of differing design be desired, the shaping tool would be replaced by a tool in which the cutter blades 36 were shaped to conform to the size and shape of the desired undercut. Thus, the invention can be quickly adapted for uniformly and accurately forming electrodes of any desired design.

It is desired to call attention to the fact that the spacing of the top plate 19 from the sub-bottom plate 11 forms a relatively large, completely enclosed dust chamber 40 for confining the graphite dust produced by the forming operation.

It is preferred to cut or mill away the two sides of the shank 23, as shown at 39, in FIGS. 2 and 5 to expose the upper extremity of the drill bit and the lower extremity of the electrode so that the internal workings may be exposed for inspection.

While a specific form of the invention has been described and illustrated herein, it is to be understood that the same may be varied within the scope of the appended claims, without departing from the spirit of the invention.

Having thus described the invention, what is claimed and desired to be secured by Letters Patent is:

1. A spectographic electrode shaping tool for forming a socket in one extremity of an electrode rod and simultaneously forming an annular undercut in said rod adjacent said socket comprising: a rotatably mounted shank member having an axial bore; a drill bit slidably and axially mounted in said bore against which the extremity of said rod is compressed; key means causing said drill bit to rotate with said shank; a counter-bore in the upper extremity of said bore for receiving and guiding the extremity of said electrode rod concentrically against said bit; spring means resiliently urging said drill bit against the latter extremity of said rod; longitudinally extending lever slots formed in the sides of said shank member and communicating with said bore; a lever member pivotally mounted intermediate its extremities in each of said slots and having a centrifugal extremity adapted to swing outwardly under the influence of centrifugal force when said shank member is rotated; and a cutting extremity positioned to swing inwardly against said rod under the influence of the outward swing of said centrifugal extremity for forming said undercut therein.

2. A spectographic electrode shaper comprising: a vertical housing; a sub-bottom plate dividing said housing into a lower motor compartment and an upper dust compartment; a top plate closing the top of said dust compartment; a motor driven shaft extending vertically through said sub-bottom plate into said dust compartment; a shank member mounted at its lower extremity on said motor shaft and extending upwardly through and being rotatable in said top plate; an axial bore extending vertically and axially downward in said shank; a drill bit mounted in the lower extremity of said bore and extending vertically upward therein, said drill bit being vertically slidable in said bore; a counter-bore in the upper extremity of said axial bore for receiving and guiding said electrode rod concentrically downward against said drill bit; a spring constantly and resiliently urging said drill bit upwardly against the lower extremity of said electrode rod for forming a cavity in the lower end of the latter; key means in said shank engaging a limiting notch in said drill bit for preventing relative rotation between said shank and said drill bit and for limiting the degree of vertical movement of said bit; a freely swinging lever member pivotally mounted in and at one side of said shank, said lever member having a longer lower portion adapted to be centrifugally swung outwardly by the rotation of said shank and a shorter upper portion which swings inwardly in consequence of the outward movement of said lower portion; and an inwardly extending cutting blade on the upper extremity of said upper portion positioned to contact and undercut said electrode rod when said upper portion is centrifugally swung inwardly.

3. A spectographic electrode shaper as described in claim 2 having a second similar lever member similarly mounted diametrically opposite said first lever member.

References Cited by the Examiner

UNITED STATES PATENTS

| 173,885 | 2/76 | Berry | 145—115 |
| 344,926 | 7/86 | Stevens. | |
| 427,812 | 5/90 | Aiken. | |
| 456,317 | 7/91 | Snyder | 142—29 |
| 753,430 | 3/04 | Prouty | 144—45 |
| 1,079,312 | 11/13 | Chadwick. | |
| 1,197,613 | 9/61 | Dodd. | |
| 3,082,649 | 3/63 | Kehr et al. | 77—18 |

FOREIGN PATENTS 231,828  3/11  Germany.

LESTER M. SWINGLE, *Primary Examiner.*

EARL EMSHWILLER, *Examiner.*